United States Patent
Shioiri et al.

(10) Patent No.: US 8,747,275 B2
(45) Date of Patent: Jun. 10, 2014

(54) DIFFERENTIAL DEVICE

(75) Inventors: Hiroyuki Shioiri, Numazu (JP);
Michitaka Tsuchida, Susono (JP);
Makoto Taniguchi, Susono (JP); Yosuke Suzuki, Susono (JP); Takahito Endo, Susono (JP); Yoshitaka Murata, Susono (JP); Tsuyoshi Ide, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 152 days.

(21) Appl. No.: 13/146,291

(22) PCT Filed: Jan. 26, 2010

(86) PCT No.: PCT/IB2010/000129
§ 371 (c)(1),
(2), (4) Date: Sep. 9, 2011

(87) PCT Pub. No.: WO2010/086704
PCT Pub. Date: Aug. 5, 2010

(65) Prior Publication Data
US 2011/0319220 A1   Dec. 29, 2011

(30) Foreign Application Priority Data

Jan. 27, 2009   (JP) ................. 2009-015391

(51) Int. Cl.
| | | |
|---|---|---|
| F16H 48/06 | (2006.01) | |
| F16H 57/08 | (2006.01) | |
| F16H 57/02 | (2006.01) | |
| F16H 57/04 | (2010.01) | |
| F16H 61/00 | (2006.01) | |
| B21D 53/28 | (2006.01) | |
| B21K 1/30 | (2006.01) | |
| B23P 15/14 | (2006.01) | |

(52) U.S. Cl.
USPC .......... 475/220; 475/331; 29/893.2; 74/606 R (58) Field of Classification Search
USPC ................. 475/220, 331; 29/893.2; 74/606 R
See application file for complete search history.

(56) References Cited

U.S. PATENT DOCUMENTS

| | | |
|---|---|---|
| 4,125,026 A | 11/1978 | Torii et al. |
| 4,307,628 A * | 12/1981 | Yamamori et al. .......... 74/606 R |

(Continued)

FOREIGN PATENT DOCUMENTS

| | | |
|---|---|---|
| EP | 0 048 445 A1 | 3/1982 |
| EP | 1 442 818 A1 | 8/2004 |

(Continued)

OTHER PUBLICATIONS

International Search Report issued in International Patent Application No. PCT/IB2010/000129 dated May 11, 2010.

(Continued)

*Primary Examiner* — Tisha Lewis
(74) *Attorney, Agent, or Firm* — Oliff PLC (57) ABSTRACT

A differential device has a differential case that houses a gear group, and a ring gear that is disposed fitted to the differential case. The differential case and the ring gear are supported rotatably about a drive shaft. The ring gear is made up of a helical gear. The ring gear abuts the differential case in the axial direction of the drive shaft. The ring gear and the differential case are welded at an abutting portion of the ring gear and the differential case in the axial direction of the drive shaft.

5 Claims, 8 Drawing Sheets

(56) References Cited

U.S. PATENT DOCUMENTS

| | | | |
|---|---|---|---|
| 4,467,672 A | | 8/1984 | Lamy |
| 6,589,671 B1 * | | 7/2003 | Kehrer ............................ 428/683 |
| 6,656,079 B2 * | | 12/2003 | Eulenstein et al. ............ 475/331 |
| 2001/0039228 A1 * | | 11/2001 | Eulenstein et al. ............ 475/230 |
| 2012/0028750 A1 * | | 2/2012 | Mizoguchi .................... 475/230 |

FOREIGN PATENT DOCUMENTS

| | | | |
|---|---|---|---|
| JP | A-51-066629 | | 6/1976 |
| JP | A-51-004736 | | 7/1976 |
| JP | A-07-054961 | | 2/1995 |
| JP | A-2002-514511 | | 5/2002 |
| JP | A-2003-021166 | | 1/2003 |
| JP | A-2005-081351 | | 3/2005 |
| JP | A-2005-098477 | | 4/2005 |
| JP | A-2007-508145 | | 4/2007 |
| JP | A-2007-145088 | | 6/2007 |
| JP | A-2007-192326 | | 8/2007 |
| JP | 2011089650 A | * | 5/2011 |
| JP | 2011106504 A | * | 6/2011 |
| JP | 2011161506 A | * | 8/2011 |
| WO | WO 99/58287 A1 | | 11/1999 |
| WO | WO 2005/030423 A1 | | 4/2005 |
| WO | WO 2007/085848 A1 | | 8/2007 |
| WO | WO 2008/104198 A1 | | 9/2008 |

OTHER PUBLICATIONS

Written Opinion issued in International Patent Application No. PCT/IB2010/000129 dated May 11, 2010.

Office Action issued in Japanese Patent Application No. 2009-015391 dated Dec. 8, 2010 (with partial translation).

Sep. 3, 2012 Notification of Reasons for Refusal issued in Japanese Application No. 2011-027534 (with partial translation).

* cited by examiner

DIFFERENTIAL DEVICE

BACKGROUND OF THE INVENTION

1. Field of the Invention

The invention relates to a differential device, and more particularly, to a differential device that effectively allows suppressing damage to a welded portion between a differential case and a ring gear.

2. Description of the Related Art

A differential device has ordinarily a differential case that houses a gear group, and a ring gear that is disposed fitted to the differential case. The differential case and the ring gear are supported rotatably about a drive shaft. Integral welding of the differential case and the ring gear is a recent trend. Japanese Patent Application Publication No. 2007-192326 (JP-A-2007-192326) discloses a conventional differential device that relies on such a configuration.

Another recent trend is the use of ring gears that have a helical gear. In such a configuration, a thrust load (helical gear-specific thrust load), derived from the helical angle of the helical gear, acts on the ring gear. Thrust load may damage the welded portion of the differential case and the ring gear (for instance, weld detachment).

SUMMARY OF THE INVENTION

In the light of the above, therefore, it is an object of the invention to provide a differential device that allows effectively suppressing damage of a welded portion between a differential case and a ring gear.

In one aspect of the invention there is provided a differential device that has a differential case that houses a gear group, and a ring gear disposed fitted to the differential case, the differential case and the ring gear being supported rotatably about a drive shaft, wherein the ring gear is formed by a helical gear, the ring gear abuts the differential case in the axial direction of the drive shaft, and the ring gear and the differential case are welded at an abutting portion of the ring gear and the differential case in the axial direction of the drive shaft.

When the ring gear has a helical gear in such a differential device, the ring gear abuts the differential case in the axial direction of the drive shaft, and the ring gear and the differential case are welded at an abutting portion of the ring gear and the differential case in the axial direction of the drive shaft. In such a configuration, thrust bending stress is less likely to occur at the position of the welded portion when a thrust load acts on the ring gear, in the direction towards the abutting portion with the differential case, in the axial direction of the drive shaft. The strength of the welded portion is secured as a result, and damage to the welded portion (for instance, weld detachment) is suppressed, which is advantageous.

In the differential device according to the invention, preferably, the differential case has a main body portion that holds the gear group, and end portions that extend along the drive shaft from the main body portion; the ring gear is disposed fitted to the outer periphery of the end portion; the ring gear abuts the main body portion in the axial direction of the drive shaft; and the ring gear and the differential case are welded at an abutting portion of the ring gear and the differential case, in the axial direction of the drive shaft.

Such a differential device is advantageous in that the position of the welded portion of the ring gear and the differential case is optimized, whereby the strength of the welded portion is secured.

In the differential device according to the invention, a flat finishing may suitably be applied to the face of the ring gear, the face being positioned on the opposite side to a welded portion between the ring gear and the differential case, from among both faces of the ring gear that are positioned in the axial direction of the drive shaft.

In such a differential device, an adequate pressing surface is secured for a test probe, since a flat finishing is applied to the face of the ring gear that is positioned on the opposite side to a welded portion between the ring gear and the differential case, from among both faces of the ring gear. Testing of the welded portion is thus carried out appropriately, which is advantageous.

The differential device according to the invention may suitably have a pinion shaft that is disposed inside the differential case and that couples the differential case and the gear group; and a fixing pin that is inserted into a pin insertion hole provided in the differential case and that fixes the pinion shaft; wherein the ring gear blocks an inlet portion of the pin insertion hole.

Such a differential device is advantageous in that the fixing pin is prevented from coming off the pin insertion hole, whereby the reliability of the device is enhanced.

In the differential device according to the invention, the ring gear and the differential case may be appropriately welded at a position where the ring gear blocks the inlet portion of the pin insertion hole.

Such a differential device is advantageous in that gas generated during welding can escape into the pin insertion hole. This reduces the likelihood of welded portion failure.

In another aspect of the invention there is provided a differential device that has a differential case that houses a gear group, and a ring gear disposed fitted to the differential device, such that the differential case and the ring gear are supported rotatably about a drive shaft, and wherein the ring gear has a helical gear having a ring-like structure, the ring gear abuts the differential case, in the axial direction of the drive shaft, and the ring gear and the differential case are welded to each other at a fitting face.

In such a differential device, the ring gear abuts the differential case in the axial direction of the drive shaft, and the ring gear and the differential case are welded to each other at a fitting face. In such a configuration, thrust bending stress is less likely to occur at the position of the welded portion when a thrust load acts on the ring gear in the direction towards the abutting portion with the differential case, in the axial direction of the drive shaft. The strength of the welded portion is secured thereby, so that damage Of the welded portion (for instance, weld detachment) is suppressed, which is advantageous.

In the differential device according to the invention, the differential case may suitably have a flange portion having a stepped shape, wherein when the ring gear is disposed fitted to the flange portion, the ring gear abuts the flange portion in the axial direction of the drive shaft, and the ring gear and the flange portion are welded at the fitting face of the ring gear and the flange portion.

In such a differential device, the position of the welded portion of the ring gear and the differential case is optimized, and the strength of the welded portion is secured.

The differential device according to the invention may suitably have a bearing that abuts the ring gear in the axial direction of the drive shaft, such that the ring gear is wedged between the bearing and the differential case.

In such a differential device, thrust bending stress is less likely to occur at the position of the welded portion when a thrust load acts on the ring gear in the direction towards the abutting portion with the bearing, in the axial direction of the drive shaft. The strength of the welded portion is secured as a result, which is advantageous.

The differential device according to the invention satisfies a relationship Rw<Rx, wherein Rw is the distance from the shaft center of the drive shaft up to a radial direction position of a welded portion between the ring gear and the differential case, and Rx is the distance from the shaft center of the drive shaft up to a radial direction position of an abutting portion of the ring gear and the bearing, where the radial direction position designates the position in the radial direction of the drive shaft.

In such a differential device, the distance Rw from the shaft center of the drive shaft to the radial direction position of the welded portion is optimized relative to the distance Rx from the shaft center of the drive shaft up to the radial direction position of the abutting portion of the bearing and the ring gear. Therefore, when a thrust load acts on the ring gear in the direction towards the abutting portion with the bearing, in the axial direction of the drive shaft, the thrust load is supported further outwards in the radial direction of the ring gear than the distance Rw from the shaft center of the drive shaft up to the radial direction position of the welded portion. Occurrence of thrust bending stress in the welded portion is suppressed thereby, so that the strength of the welded portion is secured, which is advantageous.

When in the differential device according to the invention the ring gear is a helical gear, the ring gear abuts the differential case in the axial direction of the drive shaft, and the ring gear and the differential case are welded at an abutting portion of the ring gear and the differential case, in the axial direction of the drive shaft. In such a configuration, thrust bending stress is less likely to occur at the welded portion when a thrust load acts on the ring gear in the direction towards the abutting portion with the differential case, in the axial direction of the drive shaft. The strength of the welded portion is secured as a result, and damage to the welded portion (for instance, weld detachment) is suppressed, which is advantageous.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Embodiments of the invention are explained next in detail with reference to accompanying drawings. The invention, however, is not limited by the embodiments. The constituent elements include constituent elements that can be substituted, in obvious ways, while preserving the identity of the invention. Moreover, the Various modifications set forth in the embodiments can be appropriately combined in ways that would be evident to a person skilled in the art.

Figure 1:
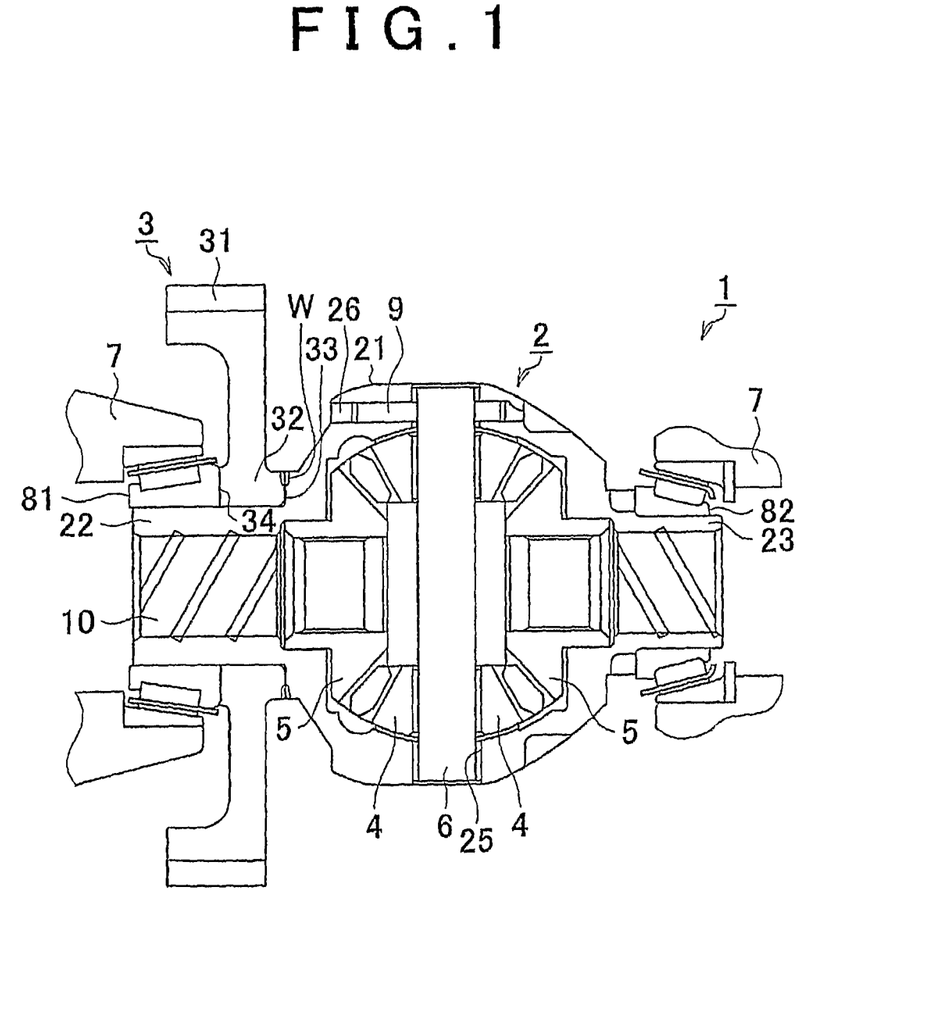
FIG. 1 is a schematic diagram illustrating a differential device according to a first embodiment of the invention.
Figure 2:
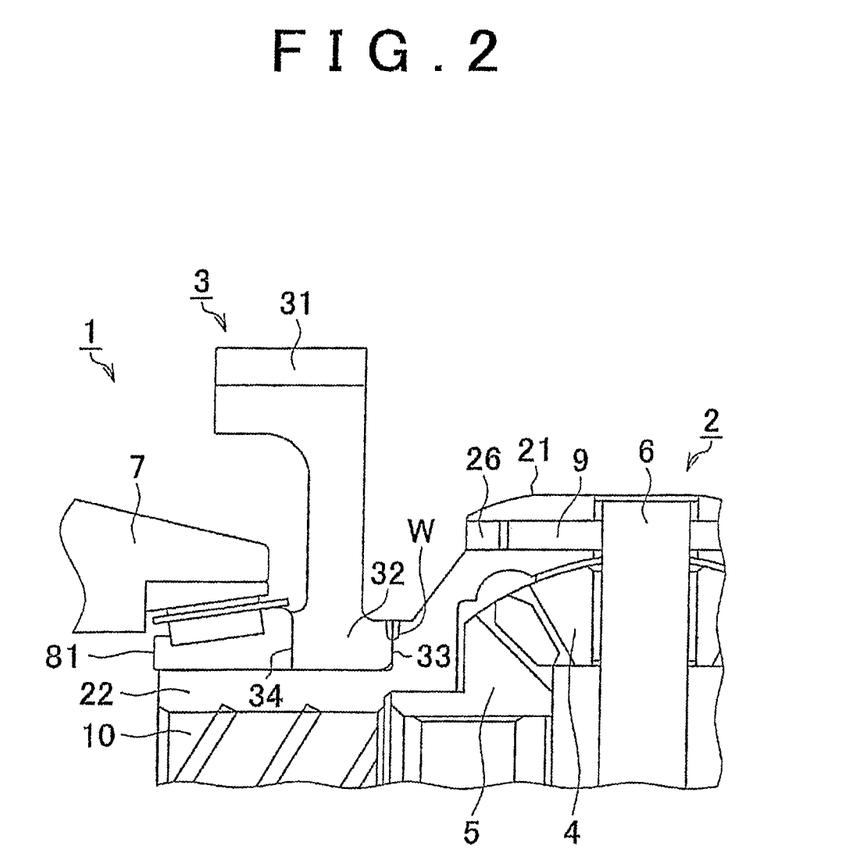
FIG. 2 is an enlarged diagram illustrating a welded portion in the differential device depicted in FIG. 1.
Figure 3:
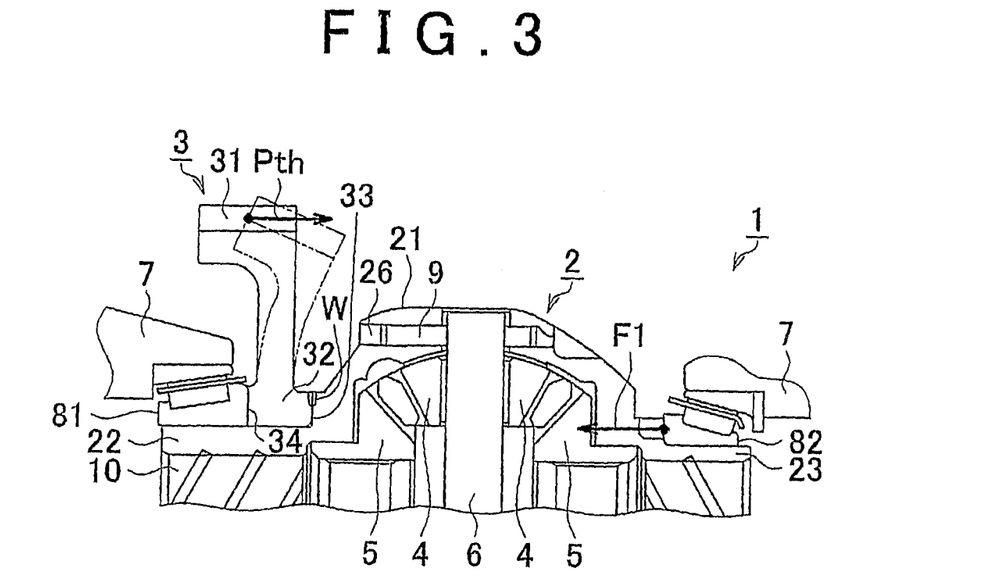
FIG. 3 is an explanatory diagram illustrating the operation of the differential device illustrated in FIG. 1.
Figure 4:
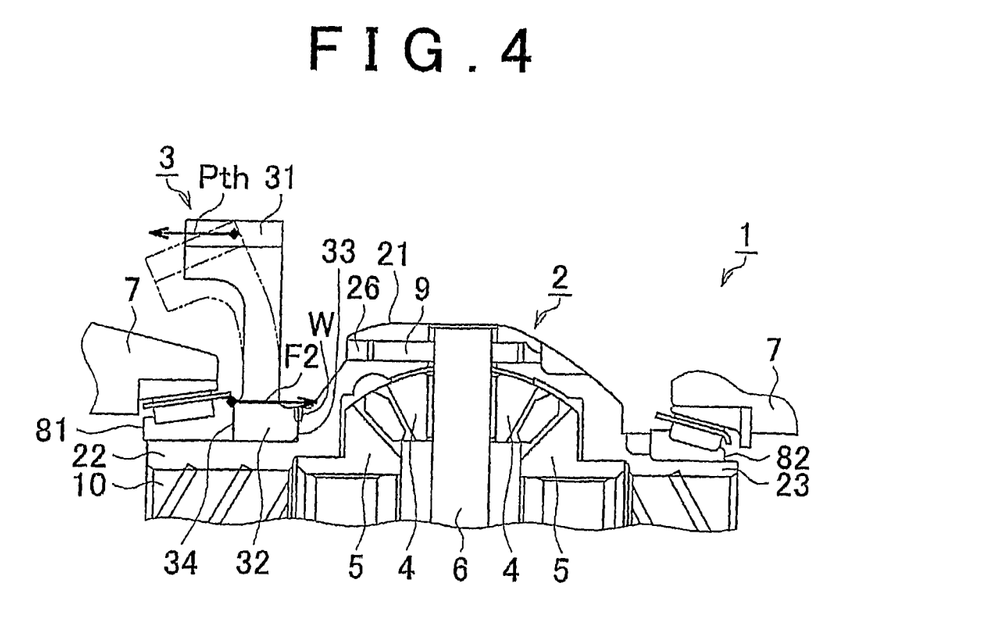
FIG. 4 is an explanatory diagram illustrating the operation of the differential device illustrated in FIG. 1.
Figure 5:
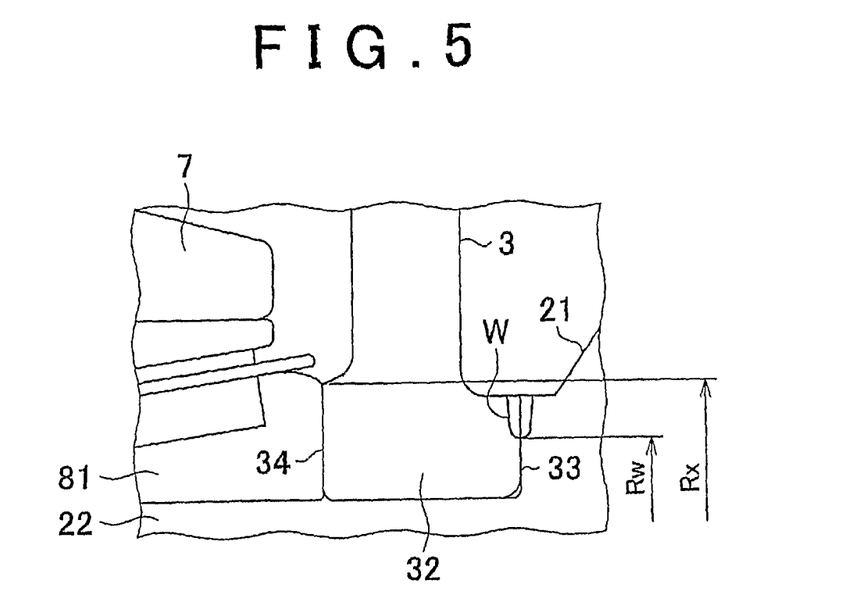
FIG. 5 is au explanatory diagram illustrating an abutting portion and a welded portion in the differential device depicted in FIG. 1.
Figure 6:
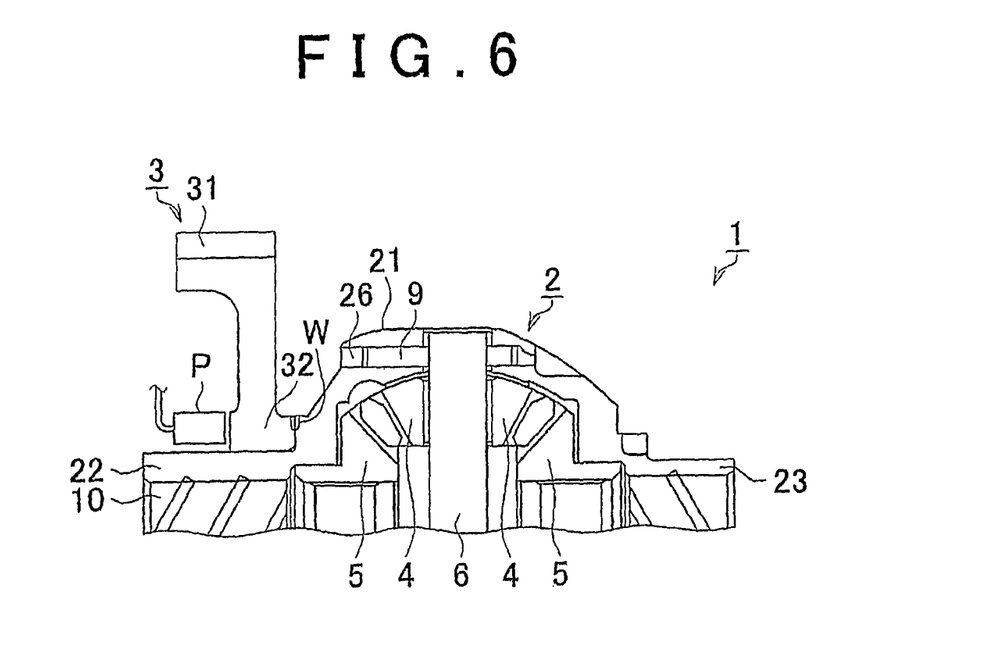
FIG. 6 is an explanatory diagram illustrating the differential device illustrated in FIG. 1 during flaw inspection.
Figure 7:
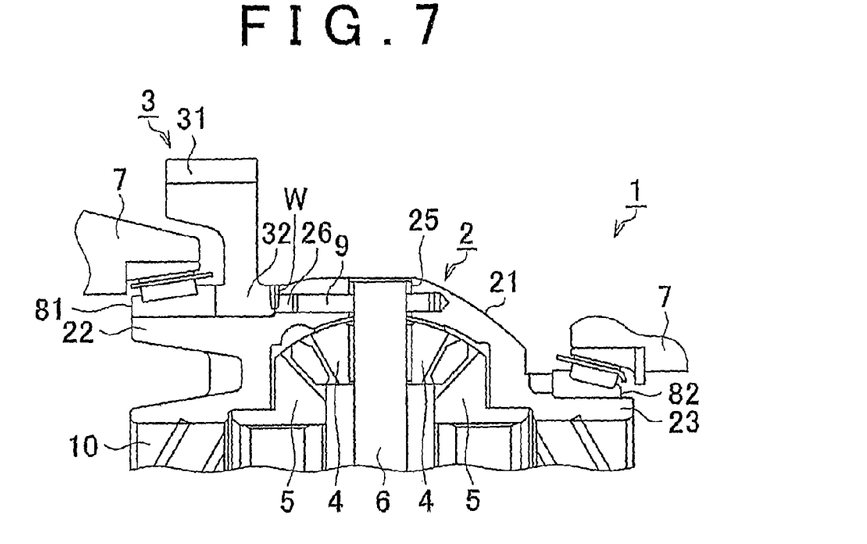
FIG. 7 is an explanatory diagram illustrating a modification of the differential device illustrated in FIG. 1.
Figure 8:
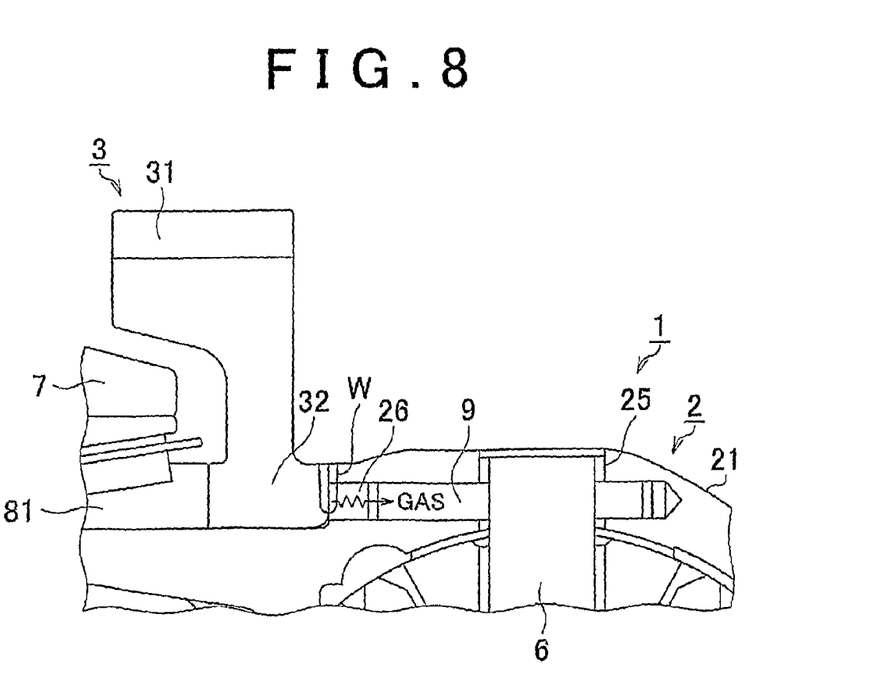
FIG. 8 is an explanatory diagram illustrating a modification of the differential device illustrated in FIG. 1.

A first embodiment of the invention will be explained first. FIG. 1 is a schematic diagram illustrating a differential device according to a first embodiment of the invention. FIG. 2 is an enlarged diagram illustrating a welded portion in the differential device depicted in FIG. 1. FIGS. 3 and 4 are explanatory diagrams illustrating the operation of the differential device illustrated in FIG. 1. FIG. 5 is an explanatory diagram illustrating an abutting portion and a welded portion in the differential device depicted in FIG. 1. FIG. 6 is an explanatory diagram illustrating the differential device illustrated in FIG. 1 during flaw inspection. FIGS. 7 and 8 are explanatory diagrams illustrating modifications of the differential device illustrated in FIG. 1.

Differential Device

A differential device 1, which is used, for instance, in a vehicle such as an automobile, has the function of transmitting power generated by an engine, to a drive shaft. The differential device 1 is provided with a differential case 2, a ring gear (differential ring) 3, pinions 4, side gears 5, a pinion shaft 6, and a housing 7 that holds the foregoing (FIG. 1).

The differential case 2 is a case that holds a gear group (pinions 4 and side gears 5). The differential case 2 is supported at both end portions 22, 23 thereof in the housing 7, by way of a pair of bearings 81, 82, so that the differential case 2 can rotate about a drive shaft. The drive shaft runs through a tubular hole 10, provided at the inner periphery of both end portions 22, 23 of the differential case 2. The drive shaft is connected to the side gears 5. In the first embodiment, the bearings 81, 82 are made up of taper bearings but are not limited thereto, and may be made up of ball bearings. The ring gear 3 is assembled with and coupled to the differential case 2, and rotates together with the differential case 2 about the drive shaft. The ring gear 3 meshes with an engine-side drive pinion (not shown). The coupling structure of the ring gear 3 and the differential case 2 is described further below. The pinions 4 and the side gears 5 are housed in the differential case 2 and are disposed meshing with each other. The pinion shaft 6, which is inserted into a Shaft insertion hole 25 provided in the differential case 2, couples the differential case 2 to the pinions 4. As a result, the pinions 4 can rotate about the pinion shaft 6 relative to the latter, and the differential case 2 and the pinions 4 can rotate together about the drive shaft. The side gears 5 are fitted and fixed to the drive shaft, and rotate integrally with the latter.

In the differential device 1, firstly, the power generated by the engine is transmitted to the ring gear 3, and the ring gear 3 and the differential case 2 rotate together about the drive shaft. Thereupon, the pinions 4 rotate together with the differential case 2. The rotation of the pinions 4 is transmitted to the drive shaft via the side gears 5. As a result, the drive shaft rotates on account of power from the engine that is transmitted to the drive shaft.

In the first embodiment, the differential case 2 and the ring gear 3 are coupled by way of the below-described coupling structure (FIGS. 1 and 2). Firstly, the differential case 2 has a main body portion 21 that houses a gear group (pinions 4 and side gears 5), and tubular end portions 22, 23 that extend along the drive shaft from both ends of the main body portion 21. The ring gear 3 is made up of a helical gear having a ring-like structure. The ring gear 3 has a gear portion 31 on the outer periphery, and a fitting portion 32 on the inner periphery. The ring gear 3 is assembled onto the differential case 2 through press-fitting of the fitting portion 32 of the ring gear 3 to one end portion 22 of the differential case 2. The ring gear 3 is positioned through abutting of the fitting portion 32 of the ring gear 3 and the main body portion 21 of the differential case 2. The gear portion 31 of the ring gear 3 meshes with the engine-side drive pinion. The bearing 81 is press-fitted to the end portion 22 of the differential case 2. The fitting portion 32 of the ring gear 3 is held wedged between the inner race of the bearing 81 and the main body portion 21 of the differential case 2. The outer race of the bearing 81 is held on the housing 7, whereby the bearing 81 is fixed.

The fitting portion 32 of the ring gear 3 and the main body portion 21 of the differential case 2 are welded to each other at the abutting portion (FIG. 2). In the first embodiment, for instance, the fitting portion 32 of the ring gear 3 is fitted to the outer periphery of one end portion 22 of the differential case 2, in the axial direction of the drive shaft. When assembled, the ring gear 3 abuts the main body portion 21 of the differential case 2, in the axial direction of the drive shaft. The ring gear 3 and the main body portion 21 of the differential case 2 are welded to each other at an abutting portion 33 in the axial direction of the drive shaft (welded portion W). The ring gear 3 and the differential case 2 are integrally fixed to each other as a result. Preferably, the welded portion W is formed by laser welding, but may be formed by any other welding method. Welding is carried out in the outer peripheral direction of the ring gear 3.

In the differential device 1, a thrust load (helical gear-specific thrust load), derived from the helical angle of the helical gear, acts on the ring gear 3 (FIGS. 3 and 4) during engine operation. Herein, damage to the welded portion W can be suppressed thanks to the above-described position of the welded portion W between the ring gear 3 and the differential case 2.

For instance, (1) when a thrust load Pth acts on the ring gear 3 in the direction towards the main body portion 21 of the differential case 2, in the axial direction of the drive shaft, a reaction force F1 from the bearing 82 on the opposite side acts on the ring gear 3 (FIG. 3). The main body portion 21 of the differential case 2 supports here the fitting portion 32 of the ring gear 3 in the axial direction of the drive shaft, and hence thrust bending stress is less likely to occur in the abutting portion 33 of the fitting portion 32 of the ring gear 3 and the main body portion 21 of the differential case 2. As a result, the welded portion W is less likely to suffer damage.

In addition, (2) when a thrust load Pth acts on the ring gear 3 in the direction towards end portion 22 of the differential case 2, in the axial direction of the drive shaft, a reaction force F2 from the bearing 81 on the same side acts on the ring gear 3 (FIG. 4). The bearing 81 supports herein the fitting portion 32 of the ring gear 3 in the axial direction of the drive shaft, and hence thrust bending stress is less likely to occur in the abutting portion 34 between the fitting portion 32 of the ring gear 3 and the bearing 81. As a result, the welded portion W is less likely to suffer damage.

When the ring gear 3 of the differential device 1 has a helical gear, as explained above, the ring gear 3 abuts the differential case 2 in the axial direction of the drive shaft, and the ring gear 3 and the differential case 2 are welded to each other at the abutting portion 33 of the ring gear 3 and the differential case 2, in the axial direction of the drive shaft (FIG. 2). In such a configuration, thrust bending stress is less likely to occur at the position of the welded portion W when a thrust load Pth acts on the ring gear 3 in the direction towards the abutting portion 33 with the differential case 2 (direction towards the main body portion 21 of the differential case 2), in the axial direction of the drive shaft, as illustrated in FIG. 3. As a result, the strength of the welded portion W is secured, and damage (for instance; weld detachment) of the welded portion W is suppressed, which is advantageous. This makes it unnecessary to increase wall thickness (wall thickness of the ring gear and the differential case) for preserving the strength of the welded portion W. Therefore, the device can be made lighter, which is likewise advantageous. In such a configuration, moreover, the weld penetration depth at the welded portion W can be made shallower, and hence the cost of the welding equipment can be reduced, which is advantageous.

In the differential device 1, as described above, the differential case 2 has a main body portion 21 that houses the gear group 4, 5, and end portions 22, 23 that extend from both ends of the main body portion 21 along the drive shaft (FIGS. 1 and 2). The ring gear 3 is disposed fitted to the outer periphery of one end portion 22 of the differential case 2. The ring gear 3 abuts herein the main body portion 21 of the differential case 2 in the axial direction of the drive shaft. The ring gear 3 and the main body portion 21 of the differential case 2 are welded to each other at the abutting portion 33, in the axial direction of the drive shaft. As a result, the position of the welded portion W between the ring gear 3 and the differential case 2 is optimized, and the strength of the welded portion W is secured.

In the differential device 1, also, the bearing 81 is disposed abutting the ring gear 3 in the axial direction of the drive shaft, so that the ring gear 3 is wedged between the bearing 81 and the differential case 2 (FIG. 2). In such a configuration, thrust bending stress is less likely to occur at the position of the welded portion W when a thrust load Pth acts on the ring gear 3, in the direction towards the abutting portion 34 with the bearing 81 (direction towards the end portion 22 of the differential case 2), in the axial direction of the drive shaft, as illustrated in FIG. 4. The strength of the welded portion W is secured as a result, which is advantageous.

The position in the radial direction of the drive shaft is called the radial direction position. Preferably, the differential device 1 satisfies a relationship Rw<Rx, wherein Rw is the distance from the shaft center of the drive shaft up to the radial direction position of the welded portion W between the ring gear 3 and the differential case 2, and Rx is the distance from the shaft center of the drive shaft up to the radial direction position: of the abutting portion 34 of the ring gear 3 and the bearing 81 (FIG. 5). In such a configuration, the radial direction position Rw of the welded portion W is optimized relative to the radial direction position Rx of the abutting portion 34 of the ring gear 3 and the bearing 81. Therefore, when a thrust load Pth acts on the ring gear 3 in a direction towards the abutting portion with the bearing 81, in the axial direction of the drive shaft, the thrust load Pth is supported by the ring gear 3 further outwards in the radial direction than the radial direction position Rw of the welded portion W (FIG. 4).

Occurrence of thrust bending stress in the welded portion W is suppressed thereby, so that the strength of the welded portion W is secured, which is advantageous.

In the first embodiment, as described above, the fitting portion 32 of the ring gear 3 and the main body portion 21 of the differential case 2 are welded to each other at the abutting portion 33. The fitting portion 32 of the ring gear 3 is held wedged between the inner race of the bearing 81 and the main body portion 21 of the differential case 2, in the axial direction of the drive shaft (FIG. 2). Herein, the distance Rw from the shaft center of the drive shaft up to the radial direction position of the welded portion W at the inward end of the welded portion W in the radial direction is positioned further inward, in the radial direction of the drive shaft, than the distance Rx from the shaft center of the drive shaft up to the radial direction position of the abutting portion 34 of the ring gear 3 and the bearing 81, at the outward end of the abutting portion 34 in the radial direction. The strength of the welded portion W is secured thereby. The relationship between the distance Rw from the shaft center of the drive shaft to the radial direction position of the welded portion W and the distance Rx from the shaft center of the drive shaft up to the radial direction position of the abutting portion 34 is set in accordance with the thrust bending stress that acts in the direction in which the welded portion W is stripped off when under load.

Welded Portion Testing

In the differential device 1, preferably, a flat finishing is applied to the face of the ring gear 3 that is positioned on the opposite side to the welded portion W between the ring gear 3 and the differential case 2, from among both faces (front and rear face) of the ring gear 3 that are positioned in the axial direction of the drive shaft. That is, the ring gear 3 abuts against and is welded to the differential case 2 at one of the two faces that are positioned in the axial direction of the drive shaft, while the other face is subjected to flattening. The welded portion W between the ring gear 3 and the differential case 2 is tested for faults (for instance, by ultrasonic testing) using a test probe P, during manufacture of the differential device 1, or during maintenance later on. An adequate pressing surface is secured for the test probe P, since the face of the ring gear 3 that is positioned on the opposite side to the welded portion W welded to the differential case 2, from among the two faces of the ring gear 3, is subjected to flattening. Testing of the welded portion W is thus carried out appropriately, which is advantageous. When the side face of the differential case 2 has, for instance, ribs (not shown), the above configuration is advantageous in that testing of the welded portion W can be performed easily over the entire circumference of the ring gear 3, without interference by the ribs.

In the first embodiment, for instance, the ring gear 3 has a ring-like structure in which the fitting portion 32 is formed in the inner periphery of the ring (FIGS. 2 and 6). The fitting portion 32 is positioned by being press-fitted to the end portion 22 of the differential case 2, and by abutting the main body portion 21 of the differential case 2, in the axial direction of the drive shaft. The fitting portion 32 is welded to the main body portion 21 of the differential case 2, as a result of which the ring gear 3 is fixed to the differential case 2. The face of the fitting portion 32 that is positioned on the side opposite the welded portion W with the differential case 2, from among both faces of the fitting portion 32 (both faces positioned in the axial direction of the drive shaft), is subjected to a flat finishing. The flat finishing is carried out by mechanical working of the cast ring gear 3. The ring gear 3 and the differential case 2 are welded together around an entire circumference of the ring gear 3. The entire circumference of the fitting portion 32 is flattened in accordance with the welded area.

The inner race of the bearing 81 abuts the face of the fitting portion 32 that has been flattened, in the axial direction of the drive shaft. The bearing 81 is disposed herein so that the ring gear 3 is wedged between the differential case 2 and the bearing 81 (FIG. 2). Thus, flattening of the fitting portion 32 has the effect of securing an appropriate abutting face with the inner race of the bearing 81.

An explanation follows next on a modification of the embodiment relating to the positional relationship between the welded portion and a pin insertion hole. As described above, the pinion shaft 6 is disposed in the differential case 2 of the differential device 1, as illustrated in FIGS. 7 and 8. As described above, the pinion shaft 6, which is inserted into the shaft insertion hole 25 provided in the differential case 2, couples the differential case 2 to the pinions 4. The pinions 4 and the differential case 2 rotate together as a result. The pinion shaft 6 is fixed to the differential case 2 by way of a fixing pin 9. The fixing pin 9 is inserted into the pinion shaft 6 through a pin insertion hole 26 provided in the differential case 2. The pinion shaft 6 is prevented thereby from coming off the shaft insertion hole 25.

In this differential device 1, the ring gear 3 is disposed so as to obstruct the inlet portion of the pin insertion hole 26 (FIGS. 7 and 8). The fixing pin 9 is prevented thereby from coming off the pin insertion hole 26, and thus the reliability of the device is enhanced, which is advantageous. As a further advantage, the fixing pin requires no crimping or the like.

In the first embodiment, for instance, the pin insertion hole 26 is opened in the main body portion 21 of the differential case 2. The pin insertion hole 26 is opened on the side of the ring gear 3, in the axial direction of the drive shaft (FIGS. 7 and 8). The far end of the pin insertion hole 26 is blocked. When the ring gear 3 is in an assembled state, the fitting portion 32 of the ring gear 3 abuts against, and is welded to, the main body portion 21 of the differential case 2, so, that the fitting portion 32 of the ring gear 3 blocks the pin insertion hole 26 at the position of the welded portion W. That is, the welded portion W and the inlet portion of the pin insertion hole 26 are disposed at substantially the same position. Such a configuration is advantageous in that it allows gases generated during welding to escape into the pin insertion hole 26. The likelihood of failure of the welded portion W is reduced as a result.

Figure 9:
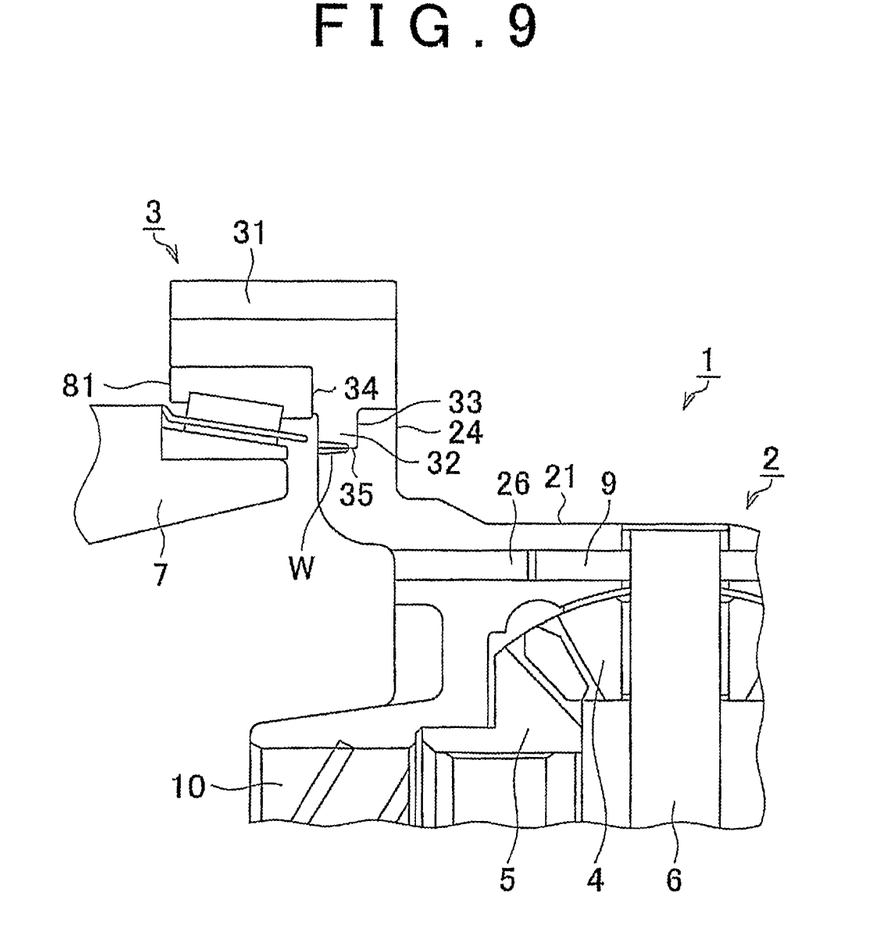
FIG. 9 is a schematic diagram illustrating a differential device according to a second embodiment of the invention.
Figure 10:
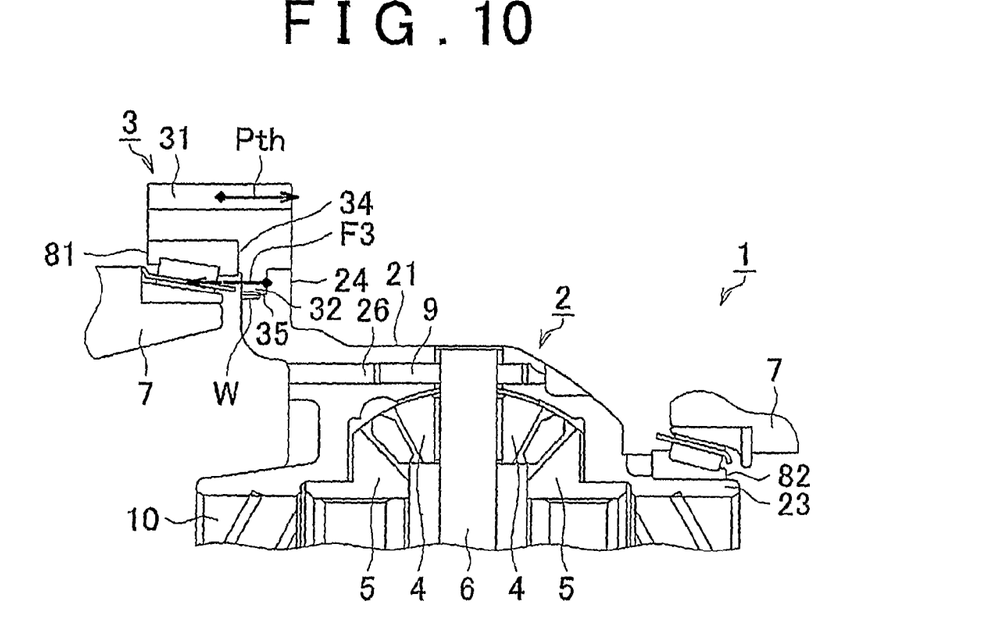
FIG. 10 is an explanatory diagram illustrating the operation of the differential device illustrated in FIG. 9.
Figure 11:
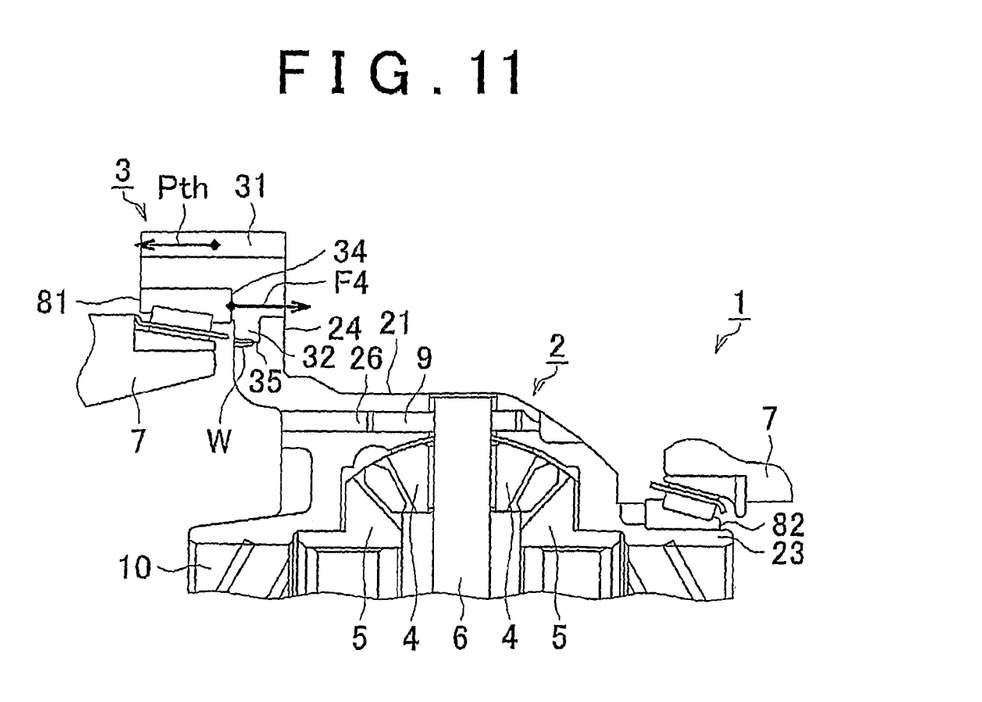
FIG. 11 is an explanatory diagram illustrating the operation of the differential device illustrated in FIG. 9.
Figure 12:
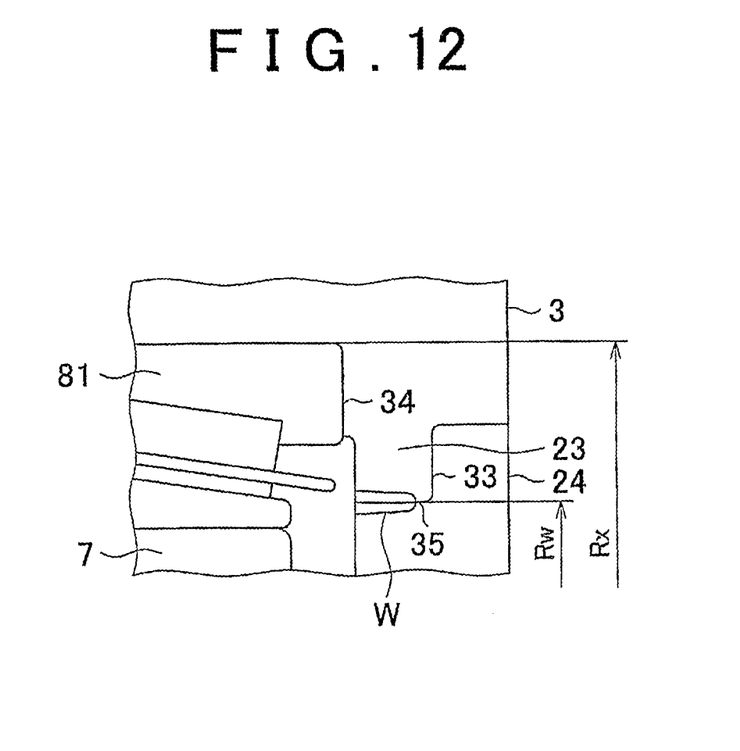
FIG. 12 is an explanatory diagram illustrating a modification of, the differential device illustrated in FIG. 9.

A second embodiment is explained next. FIG. 9 is a schematic diagram illustrating a differential device according to a second embodiment of the invention. FIGS. 10 and 11 are explanatory diagrams illustrating the operation of the differential device illustrated in FIG. 9. FIG. 12 is an explanatory diagram illustrating a modification of the differential device illustrated in FIG. 9. In the figure, constituent elements identical to those of the first embodiment are denoted with the same reference numerals, and a recurrent explanation thereof will be omitted.

The differential device 1 of the second embodiment has the following differences vis-à-vis the differential device 1 of the first embodiment (FIG. 9). Firstly, the differential case 2 has a flange portion 24. The flange portion 24 extends ring-like around the outer periphery of the main body portion 21, about the drive shaft. The outer peripheral edge of the flange portion 24 has a stepped shape (inlay shape). The ring gear 3 is assembled into the differential case 2 through press fitting of the fitting portion 32 of the ring gear 3 against the outer periphery of the flange portion 24 of the differential case 2: The ring gear 3 and the flange portion 24 are welded together at a fitting face 35 of the ring gear 3 and the flange portion 24. The ring gear 3 is positioned through abutting of the fitting portion 32 of the ring gear 3 against the flange portion 24 of the differential case 2. The bearing 81 is press-fitted against the inner periphery of the gear portion 31 of the ring gear 3. The ring gear 3 is held wedged between the outer race of the bearing 81 and the flange portion 24 of the differential case 2. The inner race of the bearing 81 is held on the housing 7, whereby the bearing 81 is fixed. As a result, the ring gear 3 and the differential case 2 are supported on two sides within the housing 7, by way of the pair of bearings 81, 82, so that the ring gear 3 and the differential case 2 are disposed rotatably about the drive shaft.

During engine operation, a thrust load (helical gear-specific thrust load), derived from the helical angle of the helical gear, acts on the ring gear 3 of the differential device 1 (FIGS. 10 and 11). Herein, the ring gear 3 abuts the flange portion 24 of the differential case 2, in the axial direction of the drive shaft, and the ring gear 3 and the flange portion 24 are welded to each other at the fitting face 35 between the ring gear 3 and the flange portion 24. Damage to the welded portion W is suppressed thereby.

For instance, (1) when a thrust load Pth acts on the ring gear 3 in the direction towards, the main body portion 21 of the differential case 2, in the axial direction of the drive shaft, a reaction force F3 from the flange portion 24 of the differential case 2 acts on the ring gear 3 (FIG. 10). Herein, the flange portion 24 of the differential case 2 supports the fitting portion 32 of the ring gear 3 in the axial direction of the drive shaft, and hence thrust bending stress is less likely to occur at that position. As a result, the welded portion W is less likely to suffer damage.

In addition, (2) when a thrust load Pth acts on the ring gear 3 in the direction towards the end portion 22 of the differential case 2, in the axial direction of the drive shaft, a reaction force F4 from the bearing 81 on the same side acts on the ring gear 3 (FIG. 11). Herein, the bearing 81 supports the fitting portion 32 of the ring gear 3 in the axial direction of the drive shaft, and hence thrust bending stress is less likely to occur at that position. As a result, the welded portion W is less likely to suffer damage.

In the differential device 1 of the second embodiment, as explained above, the ring gear 3 abuts the differential case 2 in the axial direction of the drive shaft. The ring gear 3 and the differential case 2 are welded together at the fitting face 35 (FIG. 9). In such a configuration, thrust bending stress (or shear stress) is less likely to occur at the position of the welded portion W when a thrust load Pth acts on the ring gear 3 in the direction towards the abutting portion 33 with the differential case 2 (direction towards the main body portion 21 of the differential case 2), in the axial direction of the drive shaft, as illustrated in FIG. 10. The strength of the welded portion W is secured as Q a result, so that damage to the welded portion W (for instance, weld detachment) is suppressed, which is advantageous. As a further advantage, it is no longer necessary to increase wall thickness to secure the strength of the welded portion W, and hence the equipment can be made lighter.

Specifically, the flange portion 24 of the differential case 2 has a stepped shape with a large diameter at the far end in the direction in which the ring gear 3 is assembled (direction from left to right in FIG. 9), as viewed from the cross section of the differential case 2 in the radial direction. When the ring gear 3 is in an assembled state, the fitting portion 32 of the ring gear 3 abuts the large-diameter portion of the flange portion 24 in the axial direction of the drive shaft. The ring gear 3 and the flange portion 24 of the differential case 2 are welded together at the fitting face 35. As a result, the position of the welded portion W between the ring gear 3 and the differential case 2 is optimized, and the strength of the welded portion W is secured.

In the differential device 1, the bearing 81 is disposed abutting the ring gear 3 in the axial direction of the drive shaft, so that the ring gear 3 is wedged between the bearing 81 and the differential case 2 (FIG. 9). In such a configuration, thrust bending stress is less likely to occur at the position of the welded portion W when a thrust load Pth acts on the ring gear 3 in the direction towards the abutting portion 34 with the bearing 81 (direction towards the end portion 22 of the differential case 2), in the axial direction of the drive shaft, (FIG. 11). The strength of the welded portion W is secured thereby, which is advantageous.

Preferably, the differential device 1 satisfies a relationship Rw<Rx, wherein Rw, is the distance from the shaft center of the drive shaft up to the radial direction position of the welded portion W between the ring gear 3 and the differential case 2, and Rx is the distance from the shaft center of the drive shaft up to the radial direction position of the abutting portion 34 of the ring gear 3 and the bearing 81 (FIG. 12). In such a configuration, the distance Rw from the shaft center of the drive shaft to the radial direction position of the welded portion W is optimized relative to the distance Rx from the shaft center of the drive shaft up to the radial direction position of the abutting portion 34 of the ring gear 3 and the bearing 81. Therefore, when a thrust load, Pth acts on the ring gear 3 in a direction towards the abutting portion 34 with the bearing 81, in the axial direction of the drive shaft, the thrust load Pth is supported by the ring gear 3 further outwards in the radial direction than the distance Rw from the shaft center of the drive shaft up to the radial direction position of the welded portion W (FIG. 11). Occurrence of thrust bending stress in the welded portion W is suppressed thereby, so that the strength of the welded portion W is secured, which is advantageous.

As described above, in the second embodiment the fitting portion 32 of the ring gear 3 and the flange portion 24 of the differential case 2 are welded to each other at the fitting face 35. The fitting portion 32 of the ring gear 3 is held wedged, in the axial direction of the drive shaft, between the inner race of the bearing 81 and the flange portion 24 of the differential case 2 (FIG. 9). Herein, the distance Rw from the shaft center of the drive shaft up to the radial direction position, in the radial direction, at the central portion of the welded portion W is positioned further inward, in the radial direction of the drive shaft, than the distance Rx from the shaft center of the drive shaft up to the radial direction position at the outward end of the abutting portion 34 of the ring gear 3 and the bearing 81 in the radial direction. The strength of the welded portion W is secured thereby. The relationship between the distance Rw from the shaft center of the drive shaft up to the radial direction position of the welded portion W and the distance Rx from the shaft center of the drive shaft up to the radial direction position of the abutting portion 34 is set in accordance with the thrust bending stress or shear stress that acts in the direction in which the welded portion W is stripped off when under load.

Thus, the differential device according to the invention is useful as it allows effectively suppressing damage of the welded portion between the differential case and the ring gear.

The invention claimed is:
1. A differential device, comprising
a differential case that houses a gear group, and
a ring gear disposed fitted to the differential case, wherein the differential case and the ring gear are supported rotatably about a drive shaft, the ring gear comprises a helical gear having a ring-shaped structure, the ring gear abuts the differential case in an axial direction of the drive shaft, and the ring gear and the differential case are welded at an abutting portion between the ring gear and the differential case from outside in a radial direction of the ring gear, the ring gear has a gear portion on an outer periphery of the ring gear, a fitting portion fitted to the differential case on an inner periphery of the ring gear and a ring portion that couples the gear portion and the fitting portion, and the gear portion extends beyond the differential case in the radial direction.

2. A differential device, comprising
a differential case that houses a gear group, and
a ring gear disposed fitted to the differential case, the differential case and the ring gear being supported rotatably about a drive shaft,
wherein the ring gear comprises a helical gear having a ring-shaped structure, the ring gear abuts the differential case in an axial direction of the drive shaft, and the ring gear and the differential case are welded at an abutting portion between the ring gear and the differential case from outside in a radial direction of the ring gear, the ring gear has a gear portion on an outer periphery of the ring gear and a fitting portion fitted to the differential case on an inner periphery of the ring gear, and the gear portion extends beyond the differential case in the radial direction.

3. The differential device according to claim 2, wherein the ring gear has a ring portion that couples the gear portion and the fitting portion.

4. The differential device according to claim 1, wherein the ring portion does not abut the differential case.

5. The differential device according to claim 3, wherein the ring portion does not abut the differential case.

* * * * *